United States Patent [19]

Yamaoka

[11] Patent Number: 5,246,092
[45] Date of Patent: Sep. 21, 1993

[54] VEHICLE HYDRAULIC SHOCK ABSORBER HAVING LOW FRICTION SEAL

[75] Inventor: Fumiyuki Yamaoka, Kanagawa, Japan

[73] Assignee: Atsugi Unisia Corporation, Japan

[21] Appl. No.: 928,172

[22] Filed: Aug. 14, 1992

Related U.S. Application Data

[63] Continuation of Ser. No. 643,123, Jan. 18, 1991, abandoned.

[30] Foreign Application Priority Data

Jan. 20, 1990 [JP] Japan .................... 2-11206

[51] Int. Cl.$^5$ .............................................. F16F 9/00
[52] U.S. Cl. ................................ 188/315; 188/318; 188/322.17
[58] Field of Search ............. 188/314, 315, 316, 318, 188/322.14, 322.17, 299, 312

[56] References Cited

U.S. PATENT DOCUMENTS

| | | | |
|---|---|---|---|
| 3,559,776 | 2/1971 | Schultze | 188/315 X |
| 3,682,103 | 8/1972 | Schwam | 188/316 X |
| 3,837,182 | 9/1974 | Kulhavy | 64/26 |
| 4,360,085 | 11/1981 | Pendergast | 188/315 |
| 4,561,524 | 12/1985 | Mizumukai et al. | 188/322.14 X |
| 4,752,062 | 6/1988 | Domenichini | 188/315 X |
| 4,880,087 | 11/1989 | Janes | 188/322.16 |
| 4,955,460 | 9/1990 | Lizell et al. | 188/315 X |
| 4,971,180 | 11/1990 | Kobayashi et al. | 188/315 X |
| 5,115,892 | 5/1992 | Yamaoka et al. | 188/322.17 |

FOREIGN PATENT DOCUMENTS

| | | |
|---|---|---|
| 0154088 | 9/1985 | European Pat. Off. . |
| 748471 | 5/1956 | United Kingdom . |
| 924478 | 4/1963 | United Kingdom . |
| 1125104 | 8/1968 | United Kingdom . |
| 1199175 | 7/1970 | United Kingdom . |
| 1239667 | 7/1971 | United Kingdom . |

Primary Examiner—Robert J. Oberleitner
Assistant Examiner—Lee W. Young
Attorney, Agent, or Firm—Ronald P. Kananen

[57] ABSTRACT

A hydraulic shock absorber for a vehicle includes a cylinder tube through which a piston is slidably displaced to define upper and lower chambers, a reservoir tube surrounding the cylinder tube to define a reservoir chamber, a piston rod guide member mounted in a first end portion of the cylinder tube which guides a stroke of a piston rod to which the piston is attached, a valve assembly, provided in a second end portion of said cylinder tube, for restricting fluid flow among the upper chamber, the lower chamber, and the reservoir chamber to create damping force during bounding and rebounding strokes of the piston, a seal provided in an end portion of the reservoir tube for sealing between the piston rod and the reservoir tube, and a fluid passage communicating between the valve assembly and the reservoir chamber. The fluid passage directing leak fluid from the seal of the piston rod guide member to the reservoir chamber. Thus, since the fluid in the lower chamber is allowed to leak through the piston rod guide member during a rebounding stroke of the piston rod, liquid-tight engagement is not required between the piston rod guide member and the piston rod, thus low friction is provided to allow the piston rod to be displaced smoothly.

5 Claims, 2 Drawing Sheets

VEHICLE HYDRAULIC SHOCK ABSORBER HAVING LOW FRICTION SEAL

This application is a continuation of application Ser. No. 07/643,123 filed Jan. 18, 1991, now abandoned.

BACKGROUND OF THE INVENTION

1. Field of The Invention

The present invention relates generally to a hydraulic shock absorber for a vehicle. More particularly, the invention relates to a hydraulic shock absorber which has a low friction seal for allowing a piston rod to be displaced smoothly.

2. Description of The Background Art

A Japanese Utility Model First Publication No. 58-97334 discloses a conventional inverted type shock absorber. This shock absorber includes generally upper and lower chambers which are defined by a piston in a cylinder and a reservoir chamber in an upper end section of the upper chamber which is defined by a base member. For sealing a rod guide member, a single seal member is provided which seals a clearance between a piston rod and a rod hole.

However, the single seal member of the prior art shock absorber requires high pressure in contacting the piston rod and the rod hole for establishing a liquid-tight seal, causing friction thereon to be increased. This results in low durability of the seal member and unsmooth displacement of the piston rod. Therefore, if the prior art shock absorber is applied to an automatic vehicle, it is uncomfortable to drive.

SUMMARY OF THE INVENTION

It is accordingly one object of the present invention to avoid the disadvantages of the prior art.

It is another object of the invention to provide a shock absorber including a low friction seal member which prevents liquid from leaking therefrom.

According to one aspect of the present invention, there is provided a hydraulic shock absorber comprising: a cylinder tube through which a piston is slidably displaced to define upper and lower chambers; a reservoir tube surrounding the cylinder tube to define a reservoir chamber; sealing means provided in an end portion of the reservoir tube for sealing between a piston rod to which the piston is attached and the reservoir tube; a piston rod guide member for guiding a stoke of the piston rod, the piston rod guide member being mounted in a first end portion of the cylinder tube so as to allow fluid flow along a peripheral surface of the piston rod in a limited amount; damping means, provided in a second end portion of the cylinder tube, for restricting fluid flow among the upper chamber, the lower chamber, and the reservoir chamber to create damping force during bounding and rebounding strokes of the piston; and a fluid passage communicating between the sealing means and the reservoir chamber, the fluid passage directing fluid flowing through the piston rod guide member to the reservoir chamber.

According to a further aspect of the present invention, there is provided a hydraulic shock absorber for a vehicle comprising: a first cylinder tube through which a piston is slidably displaced to define upper and lower chambers; a second tube surrounding the first cylinder tube with a preselected gap therebetween to define an outer chamber which is communicated with the lower chamber; a valve assembly mounted in an upper end portion of the second tube; a piston guide assembly mounted in a lower end portion of the second tube, the piston rod guide assembly engaging a piston rod including the piston on its end with a preselected gap therebetween for allowing the piston rod to be displaced in the first cylinder tube; a reservoir tube surrounding the second tube to define a reservoir chamber; a seal housing formed in an end member engaging with a lower end portion of the reservoir cylinder, the seal housing including a seal member engaging with the piston rod; and a fluid passages communicating between the seal housing and the outer chamber for directing fluid flowing through the rod guide assembly to the outer chamber.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
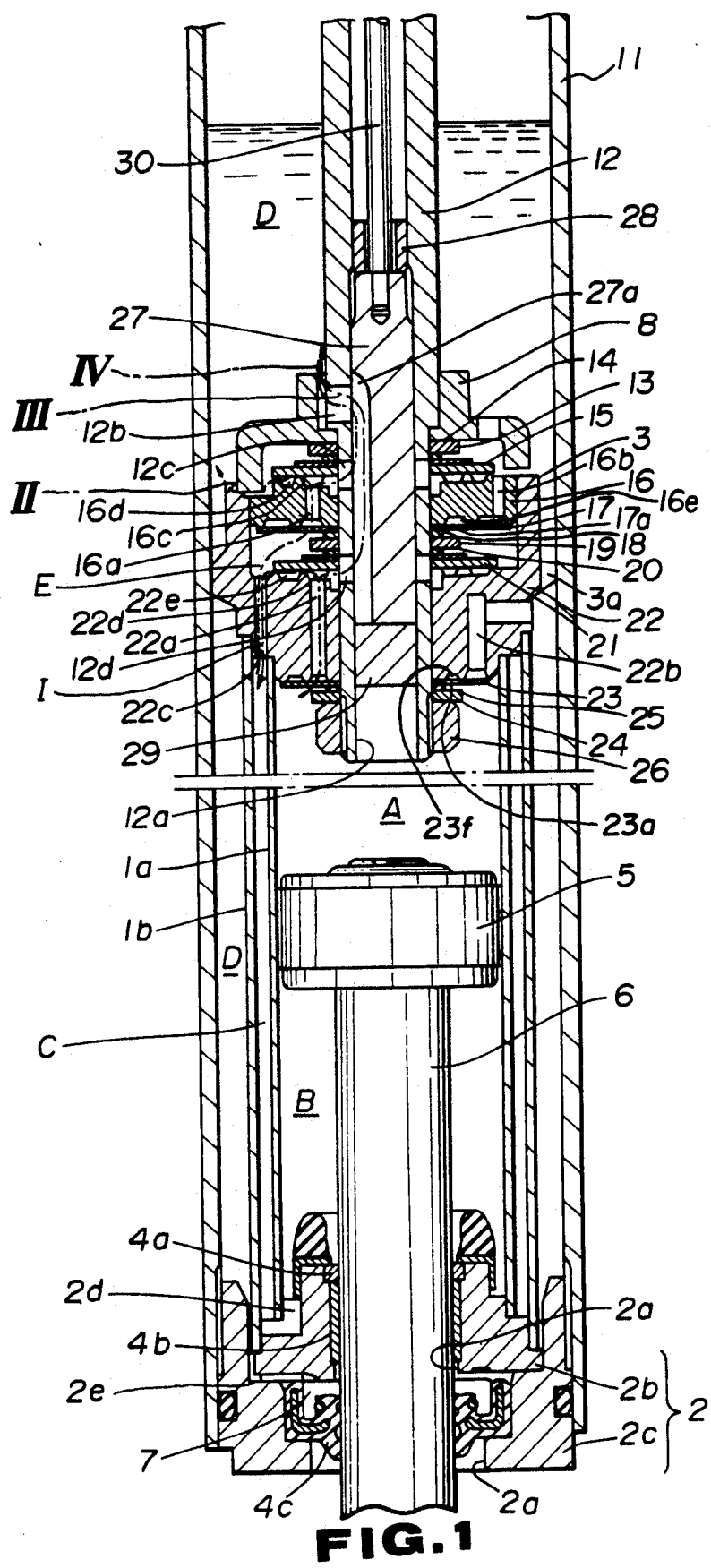
FIG. 1 is a longitudinal sectional view which shows a hydraulic shock absorber according to the present invention.

Referring now to the drawings, particularly to FIG. 1, a hydraulic shock absorber according to the present invention is shown. This shock absorber includes generally a double inner cylinder tube which is provided with first and second tubes 1a and 1b. These tubes 1a and 1b are spaced from each other to define an outer chamber C. A piston rod guide assembly 2 and a valve assembly 3 are respectively attached to upper and lower ends of the tubes with a liquid-tight seal.

The piston rod guide assembly 2 includes an inner end member 2b and an outer end member 2c through which a rod hole 2a is formed. The inner end member 2b is partly inserted into a lower opening of the tubes 1a and 1b with tight engagement therebetween. The outer member 2c engages an outer periphery of a lower end portion of the inner end member 2b.

A piston 5 is slidably provided in the first cylinder 1a to define upper and lower chambers A and B therein. The piston 5 is mounted on a top end of a piston rod 6 which is inserted into the first tube 1a through the rod hole 2a, a lower end of which is connected to a vehicle suspension member (not shown).

A pressure reducing seal 4a and a guide bush 4b are attached to an inner surface of the rod hole 2a of the inner member 2b. The pressure reducing seal 4a contacts with an outer peripheral surface of the piston rod 6 so as to allow the piston rod to be slidably displaced. The guide bush 4b serves to guide reciprocating motion of the piston rod 6 with a slight gap therebetween. Additionally, a seal chamber 7 is formed in the inner end member 2a in which an oil seal 4c is placed to establish liquid-tight sealing with the outer peripheral surface of the piston rod 6.

An outer cylinder tube 11 surrounds the second tube 1b and extends upward beyond it. The outer cylinder tube 11 has a lower opening into which the outer end member 2c is screwed and an upper opening which is covered by an end cap (not shown) and fixed on the vehicle body. The valve assembly 3 contacts with an upper side section of an intermediate inner surface of the outer cylinder tube 11.

A reservoir chamber D is formed in the outer cylinder tube 11 which includes upper and lower sections defined by the valve assembly 3. These sections communicate with each other through an oil passage 3a formed in an outer surface of the base member 3 and are filled with liquid under pressure developed by a gas injected into the outer cylinder tube 11.

A pressure relief passage 2e is formed in the inner end member 2b to communicate between the seal chamber 7 and a lower portion of the reservoir chamber D. A lower passage 2d is formed in the inner member 2b to communicate between the lower chamber B and the outer chamber C.

The valve assembly 3 is, as shown in FIG. 1, mounted on a support rod 12. This mounting is accomplished by placing a cover 8, a retainer 13, a washer 14, a second damping valve 15, a second body 16, a second check valve 17, a washer 18, a retainer 19, a washer 20, a first damping valve 21, a first body 22, a first check valve 23, a washer 24, and a retainer 25 on the support rod 12 in that order. Formed between the first and second bodies is an intermediate chamber E.

The first body 22 includes upper annular grooves 22d and 22e, a first passage 22a, a first check passage 22b, and a base passage 22c. The upper annular grooves 22d and 22e substantially coaxially extend and communicate with each other. The first passage 22a communicates between the upper and intermediate chambers A and E and is throttled by the first damping valve 21. The first check passage 22b communicates between the reservoir D and upper chamber A. The first check valve 23 allows the fluid to flow in a direction from the reservoir chamber D to the upper chamber A. The base passage 22c communicates between the intermediate chamber E and outer chamber C.

The first passage 22a communicates with the upper chamber A through an inner annular groove 22f formed in the lower surface of the first body 22 and a through hole 23a formed in the first check valve 23 facing the annular groove 22f.

the second body 16 includes upper annular grooves 16c and 16d in its upper surface, a second passage 16a, and a second check passage 16d. The upper annular grooves 16c and 16d substantially coaxially extend and communicate with each other. The second passage 16a communicates between the intermediate chamber D and reservoir chamber D and is throttled by the second damping valve 15. The second check passage 16b communicates between the reservoir D and the intermediate chamber E. An inner annular groove 16e is formed in the lower surface of the second body 16 and a through hole 17a is formed in the second check valve in communication with the annular groove 16e. The second check valve 17 allows the fluid to flow into the intermediate chamber E from the reservoir chamber D and restricts backflow.

The support rod 12 includes a through bore 12a which extends in an axial direction thereof and opens toward the upper chamber A and first, second, and third ports 12b, 12c, and 12d which extend radially in the same direction. These ports 12b, 12c, and 12d are fluidly connected to the reservoir chamber D, the upper annular groove 16c, and the upper annular groove 22d respectively.

In the through bore 12a, an adjusting pin 27 is supported by thrust bushes 28 and 29 so as to be allowed to circumferentially rotate. The adjusting pin 27 includes a groove longitudinally extending to communicate with the first, second, and third ports 12b, 12c, and 12d for providing a variable orifice.

The adjusting pin 27 is connected to a motor actuator (not shown) through a control rod 30. The motor actuator is mounted on an upper end of the reservoir chamber D and serves to rotate the adjusting pin 27, thereby causing degrees of openings of the ports 12b, 12c, and 12d to be changed.

As mentioned previously, in this embodiment, the valve assembly 3 defines the upper, outer, and reservoir chambers A, C, and D with the passages formed therein communicating between the chambers A, C, and D. It will be appreciated that the first passage 22a, the upper annular grooves 22d and 22e, the intermediate chamber E, and the base passage 22c form a bounding passage, as indicated by a symbol I in the drawing, which allows the fluid to flow when pressure is built up within the chamber A during a compression or bounding stroke. The bounding passage I also communicates with the upper chamber A through the inner annular groove 22f and the through hole 23a.

Additionally, the base passage 22c, the intermediate chamber E, the second passage 16a, the upper annular grooves 16c and 16d provide a rebounding passage, as indicated by a symbol II in the drawing, which allows the fluid to flow therethrough during a rebounding stroke of the piston 5. The rebounding passage II communicates with the inner annular groove 16e and the through hole 17a.

The first passage 22a, the upper annular groove 22d, the third port 12d, the longitudinal groove 27a, and the first port 12b provide a bounding bypass, as indicated by a symbol III in the drawing, which allows the fluid to flow during the bounding stroke of the piston 5. The bounding bypass III also communicates with the upper chamber A through the passage formed by the annular groove 22f and the through hole 23a, as previously described.

Further, the first check passage 22b including the first check valve 23 provides a check passage for directing the fluid in the reservoir chamber to the upper chamber during the rebounding stroke.

Figure 2:
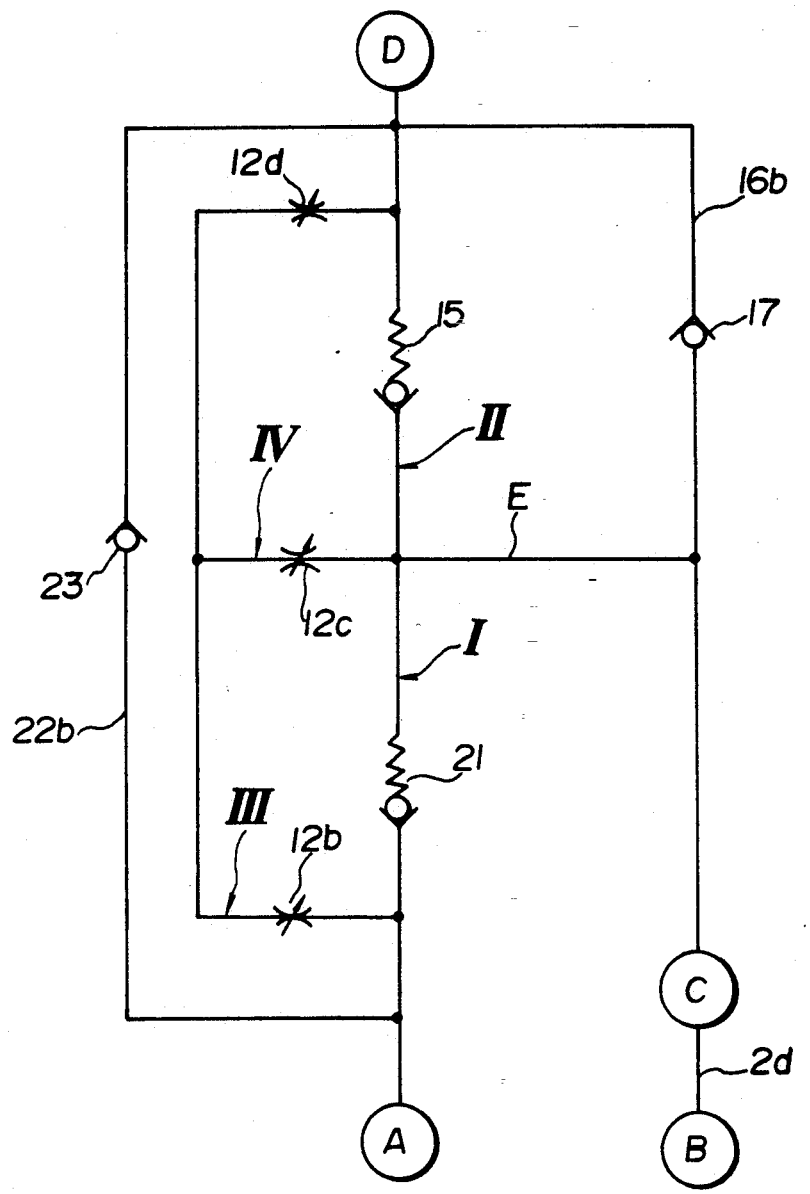
FIG. 2 is a circuit diagram which shows liquid flow in passages of a hydraulic shock absorber as shown in FIG. 1.

Referring to FIG. 2 a circuit diagram of the fluid passages in the shock absorber of the invention is shown.

In operation, rebounding motion of the piston rod 6 causes the upper chamber A in the first tube 1a to enlarge with the lower chamber B being reduced. This variation in volume of the chambers causes the fluid in the lower chamber B to flow into the outer chamber C through the lower passage 2d of the guide member 2 and then the fluid passes through the following first and second passages.

The first passage directs the fluid into the reservoir chamber D through the rebounding passage II and the second damping valve 15 and then the fluid opens the first check valve 23 through the first check passage 22b to flow into the upper chamber A. The second passage directs the fluid into the reservoir chamber D through the rebounding bypass IV extending parallel to the rebounding passage II, the second port 12c and the first port 12b forming the variable throttle valve and then the fluid in the reservoir chamber D opens the first check valve 23 through the first check passage 22b to flow into the upper chamber A.

It will be appreciated that damping force is created by the second damping valve 15 and the first and second ports 12b and 12c when the rebounding bypass IV allows the fluid to pass therethrouh as shown in FIG. 1. A relatively large amount of the fluid flows through the first and second passages within a low damping force range. In this case, a parallel combination of damping force caused by the second damping valve 15 which is proportional to piston speed to the power of two over three and damping force caused by both first and second ports 12b and 12c, which is proportional to the piston speed squared, provides damping force which increases linearly with respect to the piston speed.

Closing first and second ports 12b and 12c according to rotation of the adjusting pin 27 causes damping force to be developed dependent upon the second damping valve 15, with only a relatively small amount of fluid flow. It will be noted that the damping force increases proportional to the piston speed to the power of two over three within a high damping force range.

Areas of openings of the first and second ports 12b and 12c are variable optionally from full opened to closed status according to shifting movement of the longitudinal groove 27a caused by rotation of the adjusting pin 27, thereby varying the damping force caused by the second damping valve 15 within a range between high damping force and low damping force.

An amount of the fluid supplied to the upper chamber A from the reservoir chamber D through the first check passage 22b of the valve assembly 3 is determined by a volume of a portion of the piston rod 6 going out from the first tube 1a. Thus, if only the second damping valve is operated within the high damping force range, pressure of the upper chamber A does not become negative, preventing cavitation from occurring.

It will be appreciated that damping force created during a rebounding stroke of the piston 5 is variable over a wide range based on damping force characteristics caused by the second damping valve 15 and the first and second ports 12b and 12c.

The bounding motion of the piston 5 causes the lower chamber B in the first tube 1a to enlarge with the upper chamber A being reduced. This variation in the volume of the chambers causes the fluid in the upper chamber A to flow into the outer chamber C through the first and second passages (as described below) and then the fluid within the outer chamber C flows into the lower chamber B through the lower passage 2d.

The first passage directs the fluid into the outer chamber C though the bounding passage I and the first damping valve 21. The second passage directs fluid flow such that the fluid in the upper chamber A flows into the reservoir chamber D through the bounding bypass III, the third part 12d, and the first port 12b, the fluid in the reservoir chamber D flows into the chamber E through the second check passage 16b and the second check valve 17, and then the fluid in the chamber E flows into the outer chamber C through the base passage 22c.

Additionally, a third passage is provided which allows the fluid in the upper chamber A to flow into the reservoir chamber D during the bounding stroke. This third passage directs the fluid in the upper chamber A into the chamber E through the first passage 22a, the upper annular grooves 22d and 22e, and the first damping valve 21 and then directs the fluid in the chamber E into the reservoir chamber D through the second passage 16a, the upper annular grooves 16c and 16d, and the second damping valve 15.

It will be appreciated that damping forces are created at the first damping valve 21 and the ports 12d and 12b when the bounding bypass III allows the fluid to pass therethrough as shown in FIG. 1. A relatively large amount of the fluid flows within a low damping force range. In this case, a parallel combination of damping force caused by the first damping valve 21 which is variable proportional to piston speed to the power of two over three and damping force caused by both ports 12d and 12b which is variable proportional to the piston speed squared provides damping force increasing linearly with respect to the piston speed.

Closing both ports 12d and 2b according to rotation of the adjusting pin 27 causes the fluid in the upper chamber A to flow into the lower and the reservoir chambers B and D through the first and third passages to provide damping force at the first damping valve 21 and the second damping valve 15 with a relatively small amount of fluid flow. It will be noted that damping force is generated within the high damping force range.

Areas of openings of the ports 12d and 12b are variable optionally from fully opened to closed status according to shifting movement of the longitudinal groove 27a caused by rotation of the adjusting pin 27, thereby varying the damping force over the high damping force and the low damping force ranges.

When pressure in the outer chamber C (the lower chamber B) is lower than that of the reservoir chamber D, the second check valve is opened, supplying the fluid in the reservoir chamber D to the outer chamber C from the intermediate chamber E. Thus, if only the first damping valve 21 is operated within the high damping force range, pressure of the outer chamber C and the lower chamber B communicating with the outer chamber C does not become negative, preventing cavitation from occurring.

It will be appreciated that damping force created during a bounding stroke of the piston 5 is variable based on damping force characteristics caused by the first damping valve 15 and the ports 12d and 12b within a wide range.

For sealing operation of the rod hole 2a, rebouding motion of the piston 5 causes fluid pressure of the lower chamber B to be increased, thereby creating a pressure difference between the lower chamber B and the seal housing 7. The fluid in the lower chamber B is thus leaked into the seal housing through a small gap between the guide bush 4b and the piston rod 6 under a certain pressure reduced by the pressure reducing seal 4a. The oil seal 4c prevents the leaked fluid in the seal housing 7 from flowing out of the shock absorber.

Elevated pressure in the seal housing 7 due to the fluid leaked thereinto causes the fluid in the seal housing 7 to flow into the low pressure reservoir chamber D through the pressure relief passage 2e, thereby causing pressure in the seal housing 7 to be maintained at a reduced pressure.

As already mentioned, in the shock absorber of the invention, the pressure in the seal housing 7 is maintained the same low pressure as that of the reservoir chamber D to securely prevent fluid from being leaked in spite of low friction allowing the piston rod 6 to be displaced smoothly. This results in improved durability of the oil seal 4c.

While the invention has been disclosed in terms of the preferred embodiment in order to facilitate better understanding thereof, it should be appreciated that the invention can be embodied in various ways without departing from the principle of the invention. For example, while the above embodiment is a damping force variable type shock absorber, the invention may be directed to a shock absorber having a fixed damping force range.

Therefore, the invention should be understood to include all possible embodiments and modifications to the shown embodiments which can be embodied without departing from the principle of the invention as set forth in the appended claims.

What is claimed is:

1. A hydraulic shock absorber comprising:
    a cylinder tube through which a piston is slidably displaced to define upper and lower chambers;
    a reservoir tube surrounding said cylinder tube to define a reservoir chamber;
    sealing means provided in an end portion of said reservoir tube for sealing between a piston rod to which the piston is attached and said reservoir tube;
    a piston rod guide member for guiding a stroke of the piston rod, said piston rod guide member being mounted in a first end portion of said cylinder tube so as to allow fluid flow along a peripheral surface of the piston rod in a limited amount;
    damping means, provided in a second end portion of said cylinder tube, for restricting fluid flow among the upper chamber, the lower chamber, and the reservoir chamber to create damping force during bounding and rebounding strokers of the piston; and
    a fluid passage communicating between said sealing means and said reservoir chamber, said fluid passage directing fluid flowing through said piston rod guide member to said reservoir chamber,
    wherein said cylinder tube includes an inner tube and an outer tube surrounding the inner tube with a preselected gap to define an outer chamber communicating with the lower chamber, said damping means including first, second, and third fluid passages to allow the fluid in the upper chamber to flow into the lower chamber through the outer chamber during the bounding stroke of the piston, the first fluid passage communicating between the upper chamber and the outer chamber, the second fluid passage communicating between the upper chamber and the reservoir chamber, the third passage communicating between the reservoir chamber and the outer chamber, said damping means further including fourth, fifth, and sixth passages to allow the fluid in the lower chamber into the upper chamber through the upper chamber, the fourth passage communicating between the outer chamber and the reservoir chamber, the fifth passage, including a portion separate from the fourth passage, communicating between the outer chamber and the reservoir chamber, the sixth passage communicating between the reservoir chamber and the upper chamber.

2. A hydraulic shock absorber as set forth in claim 1, wherein the first passage includes a first orifice which restricts fluid flow from the upper chamber to the reservoir chamber to generate a first damping force, the second passage including a first damping valve which restricts fluid flow from the upper chamber to the outer chamber to generate a second damping force, the third passage including a first check valve which allows fluid to flow from the reservoir chamber into the outer chamber and restrict backflow, the fourth passage including a second orifice which restricts fluid flow from the outer chamber to the reservoir chamber to generate a third damping force, the fifth passage including a second damping valve which restricts fluid flow from the outer chamber to the reservoir chamber to generate a fourth damping force, the sixth passage including a second check valve which allows fluid flow from the reservoir chamber to the upper chamber.

3. A hydraulic shock absorber as set forth in claim 2, wherein said damping means further includes orifice opening adjusting means for adjusting opening area of the first and second orifices to change the magnitude of the first and third damping forces.

4. A hydraulic shock absorber as set forth in claim 3, wherein said orifice opening adjusting means includes an adjusting pin having a groove which communicates with the first and second orifices to provide parts of the first and fourth passages, the adjusting pin being rotatable to shift the groove so as to change the opening areas of the first and second orifices for varying the magnitude of the first and third damping forces.

5. A hydraulic shock absorber as set forth in claim 1, wherein said piston rod guide member includes an opening through which the piston rod is slidably displaced and a pressure reducing seal and a guide bush disposed in the opening with a preselected gap relative to the piston rod.

* * * * *